United States Patent Office 3,635,977
Patented Jan. 18, 1972

3,635,977
CERTAIN 6-TRIFLUOROMETHYLCYTOSINES AND THIOCYTOSINES, THEIR SYNTHESIS, AND THEIR USE IN THE SYNTHESIS OF URACILS AND THIOURACILS
Albert William Lutz, Montgomery Township, Somerset County, N.J., assignor to American Cyanamid Company, Stamford, Conn.
No Drawing. Filed Nov. 3, 1969, Ser. No. 873,679
Int. Cl. C07d 51/28
U.S. Cl. 260—256.5 R        14 Claims

ABSTRACT OF THE DISCLOSURE

3 - amino - 2 - substituted - 4,4,4 - trifluoro - 2 - butenenitriles are reacted with isocyanates or isothiocyanates in the presence of an inert solvent and from 0.75 to about 1.0 mole equivalents of strong base per mole of butenenitrile to produce the novel ureido buetenenitriles of the formula:

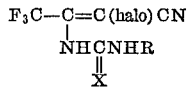

wherein R is alkyl, alkenyl, phenyl, benzyl and substituted derivatives thereof and X is sulfur or oxygen. The ureido butenenitriles are treated with additional base to produce novel cyclic cytosines of the formula:

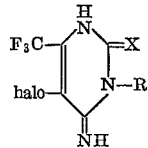

wherein R and X are as defined above. The cytosines can be produced directly by treating 3-amino-2-substituted-4,4,4-trifluoro-2-butenenitrile with at least 1.0 mole equivalents of base. The novel compounds are useful intermediates in the prepartion of herbicidal uracils and thiouracils.

SUMMARY OF THE INVENTION

Process

This invention relates to a process for preparing novel substituted 6-(trifluoromethyl) cytosines (and tautomers thereof) of the formula:

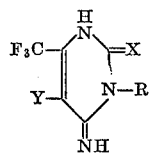

wherein:
X is sulfur or oxygen;
R is selected from the group consisting of alkyl, alkenyl, phenyl, benzyl and substituted derivatives thereof; and
Y is selected from the group consisting of hydrogen, chloro, bromo, and fluoro;

which comprises contacting a 3-amino-2-substituted-4,4,4-trifluoro-2-butenenitrile of the formula:

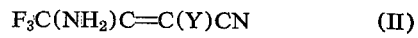

$$F_3C(NH_2)C=C(Y)CN \quad (II)$$

with a substituted isocyanate of the formula RNCX in the presence of base and an inert solvent wherein X, R, and Y are as defined above.

If the amount of base used is between about 0.75 and about 1.0 mole equivalents per mole of butenenitrile reactant, the principal product will be a novel ureido-4,4,4-trifluoro-2-butenenitrile of the formula:

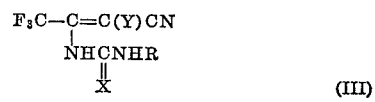

where X, Y, and R are as defined above.

When 1.0 or more moles of base are used, or when the Formula III compound is treated with additional base, cyclization occurs to yield novel cytosines and thiocytosines of the formula:

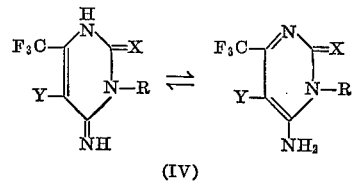

wherein X, Y, and R are as defined above.

Compounds

This invention also relates to the two groups of novel compounds prepared by the heretofore described novel process of this invention. More particularly, this invention relates to novel ureido-4,4,4-trifluoro-2-butenenitrile compounds of the formula

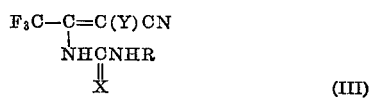

and to novel cytosine and thiocytosine compounds of the formula:

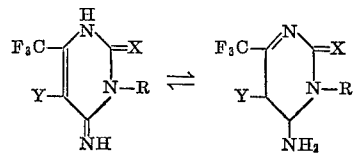

wherein X, R, and Y are as previously defined.

This invention also relates to the tautomers of the Formula IV compounds and to the water soluble salts, particularly the sodium, potassium, and ammonium salts, of the compounds and tautomers.

Utility of the compounds

The ureido compounds (III) are useful as intermediates in the preparation of the cytosines and thiocytosines (IV) which, in turn, are useful intermediates in the preparation of herbicidal uracils and thiouracils when acid hydrolyzed in accordance with the following equation:

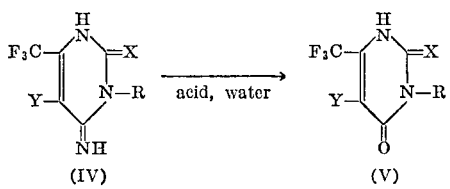

wherein X, R, and Y are as defined above.

The herbicidally effective uracils and thiouracils (V) are described and claimed in the copending application for United States Letters Patent, Ser. No. 737,308, filed June 17, 1968, in which I am named as co-inventor. The herbicidal properties of the uracils are more fully exemplified in Examples 84 and 85 hereinbelow.

Moreover, the cytosines and thiocytosines (IV) themselves possess herbicidal properties. For example, at 25 lbs./acre, 5-chloro-3-isopropyl-6-(trifluoromethyl) cytosine is effective for controlling mustard, a weed of substantial agronomic importance in crops such as small grains and forage.

DEFINITIONS

As used throughout this specification:

The term "alkyl" means straight and branched chain alkyl radicals having from 1 to 12 carbon atoms and cycloalkyl radicals having from 3 to 8 carbon atoms. Illustrative members are methyl, ethyl, isopropyl, n-butyl, tertiary butyl, hexyl, octyl, dodecyl, 2-methylhexyl, 2-ethyl-3-methylheptyl, 3,3-diethyloctyl and 2-ethyldecyl. Members such as cyclopropyl, cyclobutyl, cyclopentyl, cyclohexyl and cyclooctyl are illustrative of the cycoalkyls referred to above.

The term "alkenyl" means unsaturated straight and branched chain hydrocarbons having from 2 to 6 carbon atoms; illustrative members include allyl, 2-butenyl, and 2-methylallyl.

The terms "substituted alkyl," "substituted alkenyl," "substituted phenyl," and "substituted benzyl" mean that the basic radical may contain one or two substituents, either the same or different, selected from the group consisting of halogen, nitro, amino, lower alkyl, monohalo (lower) alkyl, polyhalo (lower) alkyl, lower alkoxy, carboxy and carb (lower) alkoxy. Illustrative members include 2-methoxyethyl, 3-ethoxypropyl, 2-bromopropyl, 3-chlorobutyl, 3-nitrophenyl, 2,3-dichlorophenyl, 2-carboxyphenyl, 2-carbomethoxypropyl, 2-chloro - 4 - nitrophenyl, tolyl, 2,4 - diaminophenyl, 2 - chlorobenzyl, 3-bromo-2-methoxypropyl, p-aminophenyl, m-trifluoromethylphenyl, 2,4-dichlorophenyl, and the like.

The term "halogen" means chloro, bromo, iodo, or fluoro.

The term "lower alkyl" means straight and branched chain alkyl radicals containing from 1 to 4 carbon atoms; illustrative members are methyl, ethyl, n-propyl, isopropyl, n-butyl, sec-butyl, and t-butyl.

The term polyhalo means 2 to 4 halogens.

The term lower alkoxy means alkoxy radicals containing from 1 to 4 carbon atoms; illustrative members are methoxy, ethoxy, propoxy, and butoxy.

DESCRIPTION OF THE PREFERRED EMBODIMENTS

The process

Starting materials.—Certain of the 3-amino-2-substituted-4,4,4-trifluoro-2-butenenitrile starting materials are described in the literature along with a process for their preparation. For example, according to Krespan [The Journal of Organic Chemistry, vol. 34, No. 1, 42–45 (1969)], said publication incorporated herein by reference, 2,3-dichlorohexafluoro-2-butene can be treated with ammonia replacing a chlorine to form 2-amino-3-chloro-1,1,1,4,4,4-hexafluoro-2-butene:

Reaction of this product at 50° with ammonia then yields the starting material 3-amino-2-chloro-4,4,4-trifluoro-2-butenenitrile:

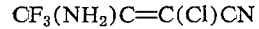

Similarly, the starting material 3-amino-2,4,4,4-tetrafluoro-2-butenenitrile

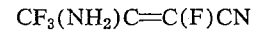

can be prepared from octafluoro-2-butene by reaction with ammonia to form 1-(trifluoromethyl)-2,3,3,3-tetrafluoropropylidenimine. Reaction of this product with ammonia yields the desired butenenitrile referred to above.

The preparation of starting material, 3 - amino - 4,4,4-tetrafluorocrotonitrile, as represented by the formula:

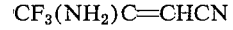

is readily prepared by reacting 2-amino-1,1,1,4,4,4-hexafluoro-2-butene with pressurized ammonia as taught by Krespan in his heretofore cited article.

The X and R substituents are provided by the reactant isocyanate, RNCX. The isocyanate compounds required to produce the designated R and X substituents are all either readily available or can be readily prepared in accordance with procedures well known to those skilled in the art and which do not bear repeating herein.

The above described reactants may be directly cyclized to useful herbicidal cytosines and uracils or they may first be converted to analogous or homologous butenenitriles and the cyclized to useful cytosines and uracils.

Reaction conditions.—(a) Temperature and pressure: The reaction may be carried out over a temperature range from about 0° C. to about 60° C. and preferably at a temperature between about 15° C. and 50° C.

The reaction can be run at subatmospheric, atmospheric, or superatmospheric pressures, with atmospheric pressure preferred.

(b) Solvents: Among the solvents which find utility in the present process are aromatic solvents having from 6 to 8 carbon atoms including the monocyclic aromatics and halogenated aromatics such as toluene, benzene, xylene, and chlorobenzene; the lower alcohols having from 1 to 8 carbon atoms including methyl, ethyl, propyl, isopropyl, amyl, isoamyl, pentyl, octyl, t-butyl and hexyl alcohol; low molecular weight glycol ethers having a molecular weight below about 200: illustrative of these ethers are diethylene glycol dimethyl ether, diethylene glycol diethyl ether, and ethylene glycol dimethyl ether; and dipolar aprotic solvents which have a coordinated valence link between two originally neutral atoms whereby one loses and the other gains a share of two electrons and which neither yields a proton to the solute, nor gains one from it. These latter solvents include, dimethylsulfoxide, dimethylformamide, acetone, methylisobutyl ketone, acetonitrile, nitrobenzene, N,N-dimethylacetamide and tetrahydrosulfolanes.

(c) Isocyanate/butenenitrile ratio: The mole ratio of isocyanate or isothiocyanate to butenenitrile is preferably 1 to 1 although a ratio of 2 to 1 may be used effectively.

(d) Bases: A strong base is essential to the reaction and is preferably selected from the group consisting of alkali metal alkoxides such as potassium tertiary butoxide, sodium methoxide, sodium propoxide; alkali metal hydroxides such as sodium hydroxide, potassium hydroxide and the like; and alkali metal hydrides such as potassium, sodium, and lithium hydride. In practice, about 1.0 or more mole equivalents of base, usually about 1 to 3 mole equivalents and preferably about 2 mole equivalents of base per mole of butenenitrile is required to achieve cyclization. Of course, as much base as desired may be used limited only by economics. When the reaction is conducted as described above but only about 0.75 to about 1.0 mole equivalents of base are used, it has been found that no substantial cyclization of the 3-aminobutenenitrile (II) to the cytosine (IV) is achieved and the predominance of product formed is a 3-substituted ureidobutenenitrile (III) corresponding in the 2 and 4 positions to the starting material. When the thus formed ureido compound is treated with additional base, cyclization occurs and the desired cytosine is formed. These reactions may be graphically shown as follows:

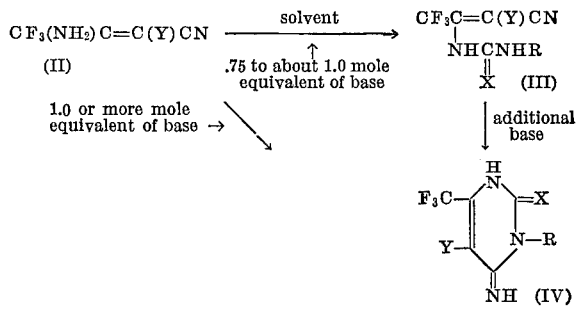

The compounds

The following are illustrative of the novel cytosines and thiocytosine compounds of the invention:

3-methyl-5-bromo-6-(trifluoromethyl)cytosine
3-propyl-5-bromo-6-(trifluoromethyl)cytosine
3-nonyl-5-fluoro-6-(trifluoromethyl)cytosine
3-dodecyl-5-bromo-6-(trifluoromethyl)cytosine
3-cyclopropyl-5-chloro-6-(trifluoromethyl)cytosine
3-cyclohexyl-5-fluoro-6-(trifluoromethyl)cytosine
3-cyclobutyl-5-chloro-6-(trifluoromethyl)cytosine
3-isopropyl-6-(trifluoromethyl)cytosine
3-decyl-6-(trifluoromethyl)cytosine
3-cyclopentyl-6-(trifluoromethyl)cytosine
3-(2-butenyl)-6-(trifluoromethyl)cytosine
3-allyl-6-(trifluoromethyl)cytosine
3-benzyl-6-(trifluoromethyl)cytosine
3-phenyl-6-(trifluoromethyl)cytosine
3-(4-chlorobutyl)-6-(trifluoromethyl)cytosine
3-(1-ethylpropyl)-6-(trifluoromethyl)cytosine
3-(3-bromo-2-methoxypropyl)-6-(trifluoromethyl)cytosine
3-(m-trifluoromethylphenyl)-6-(trifluoromethyl)cytosine
3-(2,4-dichlorophenyl)-6-(trifluoromethyl)cytosine
3-(tolyl)-6-(trifluoromethyl)cytosine
3-(2-carbomethoxypropyl)-6-(trifluoromethyl)cytosine
3-ethyl-5-bromo-6-trifluoromethyl-2-thiocytosine
3-butyl-5-fluoro-6-trifluoromethyl-2-thiocytosine
3-pentyl-5-chloro-6-trifluoromethyl-2-thiocytosine
3-octyl-5-chloro-6-trifluoromethyl-2-thiocytosine
3-undecyl-5-fluoro-6-trifluoromethyl-2-thiocytosine
3-(p-carboxyphenyl)-5-fluoro-6-trifluoromethyl-2-thiocytosine
3-(2,4-dichlorophenyl)-5-chloro-6-trifluoromethyl-2-thiocytosine
3-(1-ethylpropyl)-5-bromo-6-trifluoromethyl-2-thiocytosine
3-isopropyl-6-trifluoromethyl-2-thiocytosine
3-(t-butyl)-6-trifluoromethyl-2-thiocytosine
3-heptyl-6-trifluoromethyl-2-thiocytosine
3-cycloheptyl-6-trifluoromethyl-2-thiocytosine
3-(2-methylallyl)-6-trifluoromethyl-2-thiocytosine
3-benzyl-6-trifluoromethyl-2-thiocytosine
3-phenyl-6-trifluoromethyl-2-thiocytosine
3-(1-ethylpropyl)-6-trifluoromethyl-2-thiocytosine
3-(3-methoxypropyl)-6-trifluoromethyl-2-thiocytosine
3-(2,3-dibromopropyl)-6-trifluoromethyl-2-thiocytosine
3-(p-carboxyphenyl)-6-trifluoromethyl-2-thiocytosine
3-tolyl-6-trifluoromethyl-2-thiocytosine
3-(3,4-dichlorophenyl)-6-trifluoromethyl-2-thiocytosine The following are illustrative of the novel ureido-4,4,4-trifluoro-2-butenenitrile compounds of this invention.

1-[2-cyano-2-bromo-1-(trifluoromethyl)-vinyl]-3-methylurea
1-[2-cyano-2-bromo-1-(trifluoromethyl)vinyl]-3-propylurea
1-[2-cyano-2-bromo-1-(trifluoromethyl)-vinyl]-3-nonylurea
1-[2-cyano-2-bromo-1-(trifluoromethyl)-vinyl]-3-dodecylurea
1-[2-cyano-2-bromo-1-(trifluoromethyl)-vinyl]-3-cyclopropylurea
1-[2-cyano-2-bromo-1-(trifluoromethyl)-vinyl]-3-cyclohexylurea
1-[2-cyano-2-bromo-1-(trifluoromethyl)-vinyl]-3-cyclobutylurea
1-[2-cyano-1-(trifluoromethyl)vinyl]-3-isopropylurea
1-[2-cyano-1-(trifluoromethyl)vinyl-3-decylurea
1-[2-cyano-1-(trifluoromethyl)vinyl]-3-cyclopentylurea
1-[2-cyano-1-(trifluoromethyl)vinyl]-3-(2-butenyl)urea
1-[2-cyano-1-(trifluoromethyl)vinyl-3-allylurea
1-[2-cyano-1-(trifluoromethyl)vinyl]-3-benzylurea
1-[2-cyano-1-(trifluoromethyl)vinyl]-3-phenylurea
1-[2-cyano-1-(trifluoromethyl)vinyl]-3(4-chlorobutyl)urea
1-[2-cyano-1-(trifluoromethyl)vinyl]-3(1-ethylpropyl)urea
1-[2-cyano-1-(trifluoromethyl)vinyl]-3-(3-bromo-2-methoxypropyl)urea
1-[2-cyano-1-(trifluoromethyl)vinyl]-3-(m-trifluoromethylphenyl)urea
1-[2-cyano-1-(trifluoromethyl)vinyl]-3-(2,4-dichlorophenyl)urea
1-[2-cyano-1-(trifluoromethyl)vinyl]-3-(tolyl)urea
1-[2-cyano-1-(trifluoromethyl)vinyl]-3-(2-carbomethoxypropyl)urea
1-[2-cyano-2-bromo-1-(trifluoromethyl)vinyl-3-ethylurea
1-[2-cyano-2-fluoro-1-(trifluoromethyl)vinyl]-3-butylurea
1-[2-cyano-2-chloro-1-(trifluoromethyl)vinyl]-3-pentylurea
1-[2-cyano-2-chloro-1-(trifluoromethyl)vinyl]-3-octylurea
1-[2-cyano-2-fluoro-1-(trifluoromethyl)vinyl]-3-undecylurea
1-[2-cyano-1-(trifluoromethyl)vinyl]-3-(p-carboxyphenyl)urea
1-[2-cyano-1-(trifluoromethyl)vinyl]-3-(2,4-dichlorophenyl)urea
1-[2-cyano-1-(trifluoromethyl)vinyl]-3-(1-ethylpropyl-2-bromo)urea
1-[2-cyano-1-(trifluoromethyl)vinyl]-3-isopropylurea
1-[2-cyano-1-(trifluoromethyl)vinyl]-3-(t-butyl)urea
1-[2-cyano-1-(trifluoromethyl)vinyl]-3-heptylurea
1-[2-cyano-1-(trifluoromethyl)vinyl]-3-cycloheptylurea
1-[2-cyano-1-(trifluoromethyl)vinyl]-3-(2-methylallyl)urea
1-[2-cyano-1-(trifluoromethyl)vinyl]-3-benzylurea
1-[2-cyano-1-(trifluoromethyl)vinyl]-3-phenylurea
1-[2-cyano-1-(trifluoromethyl)vinyl]-3-(1-ethylpropyl)urea
1-[2-cyano-1-(trifluoromethyl)vinyl]-3-(3-methoxypropyl)urea
1-[2-cyano-1-(trifluoromethyl)vinyl]-3-(2,3-dibromopropyl)urea
1-[2-cyano-1-(trifluoromethyl)vinyl]-3-(p-carboxyphenyl)urea
1-[2-cyano-1-(trifluoromethyl)vinyl]-3-tolylurea
1-[2-cyano-1-trifluoromethyl)vinyl-3-(3,4-dichlorophenyl)urea Advantageously, the herbicidal compounds, prepared in accordance with the process of the present invention, may be formulated with conventional carriers and applied with conventional type application equipment. For example, the active compounds may be formulated as dusts, dust concentrates, emulsifiable concentrates, wettable powders and the like.

Wettable powder formulations are generally prepared by admixing from about 25% to about 95%, by weight, of active ingredient with finely ground clay, such as kaolin or attapulgite. Generally about 3% to 10% by weight of a surface active agent is added. Alkali metal lignosulfonates, calcium salts of alkyl, aryl, sulfonic acid, sodium isothionate and alkyl phenoxy polyethylene ethanol are illustrative of such agents. The formulation is then dispersed in water for spray application.

Dusts and dust concentrates are similarly prepared using from about 5% to about 95% of active ingredient and from about 95% to about 5% of finely divided inert ingredients. These dusts are generally applied as such, or they may be further diluted with finely ground inert solids and then applied with conventional dusting apparatus.

Emulsifiable concentrates may be prepared by dissolving or dispersing the active ingredient in organic solvent, with about 3% to 10% by weight of an emulsifying agent, a surfactant, as described above, or the like. Such formulations are then diluted with either water or an appropriate organic diluent prior to application.

The following examples are provided to further illustrate the invention.

EXAMPLE 1

Preparation of 5-chloro-3-isopropyl-6-(trifluoromethyl) cytosine

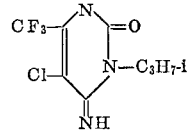

3 - amino - 2 - chloro - 4,4,4 - trifluoro - 2 - butenenitrile (7.0 g., 41 mmoles) was added in a dropwise manner to a stirred solution of potassium-tert-butoxide (4.6 g., 41 mmoles) in 25 ml. of dimethylsulfoxide while maintaining the temperature at 20° C. Isopropylisocyanate (4.0 g., 47 mmole) was then added with stirring with the temperature at 20°. After one-half hour another 41 mmoles of base were added and the solution was stirred for an additional one-half hour. The reaction solution was poured into water (50 ml.) and this solution extracted with ether. The aqueous phase upon acidification deposited a solid (8.5 g., 81% yield). Recrystallization from chloroform gave the product as a white solid with M.P. 218–220° C.

EXAMPLE 2

Preparation of 5-chloro-3-isopropyl-6-(trifluoromethyl) thiocytosine

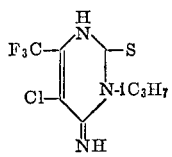

3-amino-2-chloro - 4,4,4 - trifluoro - 2 - butenenitrile (7.0 g.) is added dropwise to a stirred solution of potassium-tert-butoxide (4.6 g.) in 25 ml. of dimethylsulfoxide while maintaining the temperature at 20° C. Isopropylisothiocyanate (4 g.) is then added and the stirred solution is maintained at 20° C. To this mixture is then added an additional 4.6 g. of potassium-tert-butoxide and the resulting solution poured over ice. This mixture is extracted with ethyl ether and the remaining aqueous phase acidified with HCl to yield 5-chloro-3-isopropyl-6-(trifluoromethyl) thiocytosine.

EXAMPLE 3

Preparation of 5-bromo-3-isopropyl-6-(trifluoromethyl) cytosine

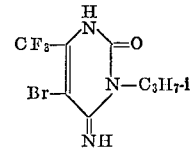

The above compound was prepared following substantially the same procedure as in Example 1 except that 3-amino - 2 - chloro-4,4,4-trifluoro-2-butenenitrile was replaced by 3-amino - 2 - bromo - 4,4,4 - trifluoro-2-butenenitrile.

EXAMPLES 4 TO 22

Following substantially the same procedures as in Examples 1, 2, or 3 except that the isocyanate and/or the number 2 substituent on the butenenitrile compound were varied, a variety of cytosines were prepared as shown in Table I below:

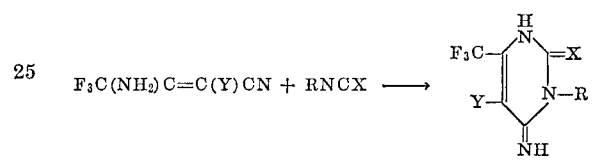

TABLE I

| Example | X | Y | R |
|---|---|---|---|
| 4 | O | Br | CH₃ |
| 5 | O | Br | C₂H₅ |
| 6 | O | Br | n-C₃H₇ |
| 7 | O | Cl | n-C₄H₉ |
| 8 | O | Br | sec-C₄H₉ |
| 9 | O | Br | n-C₁₂H₂₅ |
| 10 | O | Br | n-C₈H₁₇ |
| 11 | O | Br | ⬡ |
| 12 | O | Br | ⬡ |
| 13 | O | Br | —C₆H₃Cl₂ |
| 14 | O | Br | CH₂COOC₂H₅ |
| 15 | O | Cl | CH—(C₂H₅)₂ with CH₃ |
| 16 | O | Cl | CH₂CH=CH₂ |
| 17 | S | Br | CH₂—⬡ |
| 18 | S | Cl | —C₆H₄—NO₂ |
| 19 | O | Br | —CH₂CHBrCH₂Br |
| 20 | S | Cl | —CH₂CH₂CH₂OCH₃ |
| 21 | S | Cl | —C₆H₄—NH₂ |
| 22 | S | Cl | —C₆H₄—CH₃ |

EXAMPLE 23

Preparation of 3-isopropyl-5-fluoro-6-(trifluoromethyl) cytosine

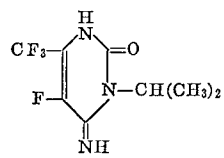

3-amino-2,4,4,4-tetrafluorocrotonitrile as prepared by Krespan in J. Org. Chem. 34, 42 (1969) (7.0 g., .045 mole) was added to a suspension of sodium methoxide (2.45 g., 0.045 mole) in DMF at 25–30° C. Isopropyl isocyanate (3.83 g., .045 mole) was added, the temperature not exceeding 30° C. The solution was then heated to about 50° C. for 0.5 hr.; then it was allowed to cool to room temperature and excess sodium methoxide (2.45 g., .045 mole) was added. After 1.5 hours at ambient temperature, the solution was poured into water and extracted with ether before acidifying to pH 2 with conc. HCl. A brown oil formed which slowly crystallized to a dark solid. This was recrystallized from acetonitrile to give a beige solid, M.P. 207–209° C. The product was homogeneous by tlc. The infrared and N.M.R. spectra supported the proposed structure.

$C_8H_9F_4N_3O$ requires (percent): C, 40.18; H, 3.79; F, 31.74; N, 17.57. Found (percent): C, 39.95; H, 3.81; F, 31.76; N, 16.52.

EXAMPLES 24 to 32

Following substantially the same procedure as in Example 23 except replacing isopropylcyanate with various isocyanate compounds, the compounds shown below in Table II were prepared.

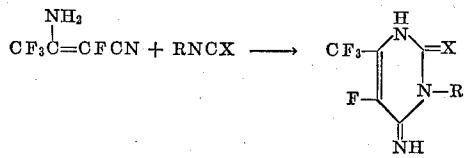

TABLE II

| Example | X | R |
|---|---|---|
| 24 | O | $CH_3$ |
| 25 | O | $CH_2CH=CH_2$ |
| 26 | O | sec-$C_4H_9$ |
| 27 | O | n-$C_{12}H_{25}$ |
| 28 | S | ⬡ |
| 29 | S | ⬡ |
| 30 | S | ⬡-Cl (Cl) |
| 31 | S | ⬡-$NO_2$ |
| 32 | S | $CH_2COOC_2H_5$ |

EXAMPLE 33

Preparation of 3-amino-4,4,4-trifluoro-2-butenenitrile

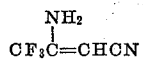

3-amino-4,4,4-trifluoro-2-butenenitrile was prepared from 2-amino-1,1,1,4,4,4-hexafluoro-2-butene according to a procedure similar to that reported by Krespan for the chloro and fluoro crotonitriles. The product, a solid, was obtained after distilling off the ether. Recrystallization from chloroform-petroleum ether gave a solid with M.P. 64.5–66° C.

*Analysis.*—Calcd. for $C_4H_3F_3N_2$ (percent): C, 35.31; H, 2.22; F, 41.89; N, 20.58. Found (percent): C, 35.23; H, 1.95; F, 41.99; N, 20.45.

EXAMPLE 34

Preparation of 3-isopropyl-6-(trifluoromethyl)cytosine

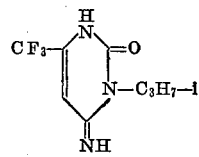

The above compound was prepared following substantially the same procedure as that given in Example 1 except that 3-amino-2-chloro-4,4,4-trifluoro-2-butenenitrile was replaced with the 3-amino-4,4,4-trifluoro-2-butenenitrile prepared in Example 33 to yield a product having a melting point of 233–235° C.

*Analysis.*—Calcd. for $C_8H_{10}F_3N_3O$ (percent): C, 43.44; H, 4.56; F, 25.77; N, 19.00. Found (percent): C, 43.61; H, 4.42; F, 25.91; N, 18.93.

EXAMPLES 35 to 49

Following substantially the same procedure as in Example 34 but replacing isopropylisocyanate with various other isocyanates, the compounds shown below in Table III were prepared.

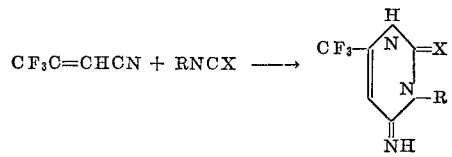

TABLE III

| Example | X | R |
|---|---|---|
| 35 | O | $CH_3$ |
| 36 | O | $C_2H_5$ |
| 37 | O | n-$C_3H_7$ |
| 38 | O | n-$C_4H_9$ |
| 39 | O | sec-$C_4H_9$ |
| 40 | O | n-$C_8H_{17}$ |
| 41 | O | n-$C_{12}H_{25}$ |
| 42 | O | ⬡ |
| 43 | O | ⬡ |
| 44 | O | ⬡-Cl (Cl) |
| 45 | O | $CH_2COOC_2H_5$ |
| 46 | O | $CH_2CH=CH_2$ |
| 47 | S | ⬡-$NO_2$ |
| 48 | S | $CH_2CHCH_2$ (Br, Br) |
| 49 | S | $CH_3$ |

EXAMPLE 50

Preparation of 1-[2[cyano-2-fluoro-1-(trifluoromethyl)-vinyl]-3-isopropylurea

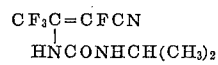

3-amino-2,4,4,4-tetrafluoro-2-butenenitrile was added to a suspension of sodium methoxide (0.35 g., .0065 mole) in DMF at 20° C. Isopropylisocyanate (0.55 g. 0.0065 mole) was added with cooling. The reaction was maintained at this temperature for 2 hours, then poured into water which was extracted with ether and then acidified to pH 2 with conc. HCl. A brown oil formed which solidified to a tan solid (melting point 142–145° C.) after several hours. The infrared and N.M.R. spectra supported the proposed structure.

$C_8H_9F_4N_3O$ requires (percent): C, 40.18; H, 3.79; F, 31.77; N, 17.5. Found (percent): C, 40.23; H, 3.82; F, 31.58; N, 16.95.

EXAMPLE 51

Preparation of 1-[2-cyano-1-(trifluoromethyl)-vinyl]-3-isopropylurea

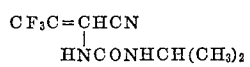

The above compound was prepared following substantially the same procedure as in Example 50 except that 3 - amino-2,4,4,4-tetrafluoro-2-butenenitrile was replaced with the 3-amino-4,4,4-trifluoro-2-buteneitrile prepared in Example 33; M.P. 156–157° C.

*Analysis.*—Calcd. for $C_8H_{10}F_3N_3O$ (percent): C, 40.30; H, 5.06; F, 23.85; N, 17.65. Found (percent): C, 40.72; H, 4.26; F. 23.80; N, 17.68.

EXAMPLES 52 to 67

Preparation of 1-[2-cyano-2-chloro-1-(trifluoromethyl)-vinyl-3-isopropylurea

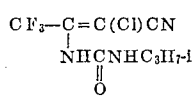

3-amino-2-chloro-4,4,4-trifluoro - 2 - butenenitrile (0.05 mole) is admixed with a solution of (0.05 mole) sodium methoxide in 50 ml. of dimethylsulfoxide. The reaction mixture is maintained at 40° C. and 0.07 mole of isopropylisocyanate is added with continuous stirring. The mixture is then poured into ice water and extracted with diethylether. The aqueous phase is acidified with hydrochloric acid yielding the named product.

The reaction product was worked up as described heretofore and recrystallized from ethanol-water yielding the above described product having a melting point of 162–164° C. By warming this ureido compound in methanol containing an equivalent of sodium methoxide, the cyclic compound, 5 - chloro - 3 - isopropyl - 6 - (trifluoromethyl) cytosine, is obtained.

Any of the substituted ureido-4,4,4-trifluoro-2-butenenitrile compounds of this invention can be prepared by merely following the procedures of Examples 50 to 52 except that the reactant isocyanate and 2-butenenitrile are varied as desired. In accordince with such procedures the compounds shown below in Table IV were prepared.

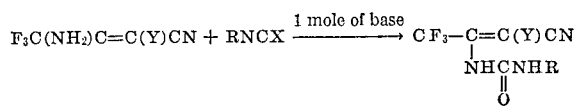

TABLE IV

| Example | Y | X | R |
|---|---|---|---|
| 53 | Cl | O | CH₃ |
| 54 | Cl | O | CH₂CH=CH₂ |
| 55 | Br | O | n-C₁₂H₂₅ |
| 56 | Br | O | ⬡ |
| 57 | Br | O | ⬡ |
| 58 | Br | S | —⬡—NO₂ |
| 59 | F | S | —⬡(Cl)—Cl |
| 60 | F | O | C₂H₅ |
| 61 | F | O | CH₂CH(Br)CH₂Br |
| 62 | F | O | —⬡—NH₂ |
| 63 | H | S | sec-C₄H₉ |
| 64 | H | O | CH₂COOC₂H₅ |
| 65 | H | O | CH₂CH=CH₂ |
| 66 | H | O | ⬡ |
| 67 | H | O | —⬡(Cl)—Cl |

EXAMPLES 68 to 82

Preparation of 5-chloro-3-isopropyl-6-(trifluoromethyl) uracil

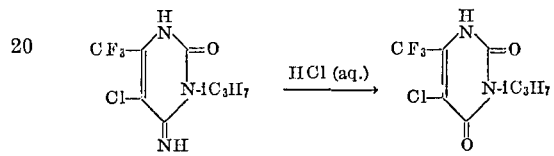

5-chloro-3-isopropyl-6-(trifluoromethyl) - cytosine (1.0 g.) is dissolved in 25 ml. of dilute hydrochloric acid (10%) and the solution brought to reflux. After one-half hour 5-chloro-3-isopropyl-6-(trifluoromethyl)-uracil has precipitated out of solution. This compound has M.P. 138° C.–139° C.

Using the above procedure but substituting the appropriate 3-substituted cytosine for the 3-isopropyl cytosine above yields the corresponding uracil as shown in Table V below.

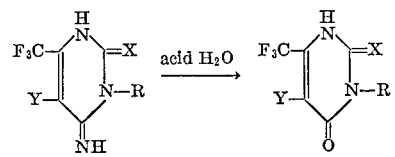

TABLE V

| Example | R | X | Y | Uracil melting point (° C.) |
|---|---|---|---|---|
| 69 | CH₃ | O | Br | 212–213.5 |
| 70 | C₂H₅ | O | Br | 197–198 |
| 71 | n-C₃H₇ | O | Br | 169–172 |
| 72 | n-C₄H₉ | O | Cl | 138–139 |
| 73 | sec-C₄H₉ | O | Br | 130–132 |
| 74 | n-C₁₂H₂₅ | O | Br | 101–102 |
| 75 | n-C₈H₁₇ | O | Br | 98–101.5 |
| 76 | ⬡ | O | Br | 187–189 |
| 77 | ⬡ | O | Br | 207–209 |
| 78 | —⬡(Cl)—Cl | O | Br | 239–240.5 |
| 79 | CH₂COOC₂H₅ | O | Br | 185–188 |
| 80 | iC₃H₇ | O | Cl | 138–139 |
| 81 | CH₃CH—(C₂H₅)₂ | O | Cl | 103–106 |

EXAMPLE 82

Preparation of 5-fluoro-3-isopropyl-6-(trifluoromethyl) uracil

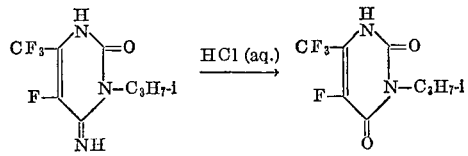

5-fluoro-3-isopropyl-6-(trifluoromethyl)cytosine (0.4 g., .0017 mole) was dissolved in 10 ml. 10% HCl and the solution maintained at reflux for about one hour. The white solid which had precipitated out of solution was removed (0.3 g. 75%) and recrystallized from 2:1 ethanol-water to yield a product having a melting point 150–152° C.

Analysis.—$C_8H_8N_2O_2F_4$ requires (percent): C, 40.01; H, 3.36; N, 11.66; F, 31.64. Found (percent): C, 39.67; H, 3.59; N, 11.49; F, 31.64.

A variety of 5-fluoro substituted uracils can be readily prepared using the above procedure except that the 5-fluoro-3-isopropyl-6-(trifluoromethyl) cytosine is replaced by those of Examples 24 to 32.

EXAMPLE 83

Preparation of 3-isopropyl-6-(trifluoromethyl)uracil

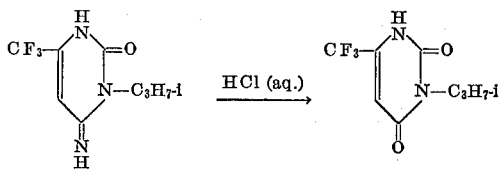

The above uracil with M.P. 139–142° C. was prepared following the procedure of Example 82 except that 5-fluoro-3-isopropyl-6-(trifluoromethyl) cytosine was replaced with the compound of Example 34.

A variety of such uracils were prepared using this procedure but wherein the compound of Example 34 is replaced by those of Examples 35 to 49.

EXAMPLE 84

Pre-emergence herbicidal activity

The pre-emergence herbicidal activity of uracils and thiouracils prepared from the novel intermediates of this invention is provided below.

In these tests seeds of a variety of monocotyledonous and dicotyledonous plants are separately mixed with potting soil and planted on top of approximately one inch of potting soil in separate pint cups. After planting, the cups are sprayed with an aqueous-actone solution containing test compound in sufficient quantity to provide the desired equivalent of four pounds per acre of test compound per cup. The treated cups are then placed on greenhouse benches and cared for in accordance with greenhouse procedures. Three weeks after treatment, the tests are terminated and each cup is examined and rated according to the Herbitoxicity Index given below. The results of these tests are presented in Table IV below.

Herbitoxicity index

9=100% reduction in stand
9−=1 or 2 stunted plants remaining
8=85–100% reduction in stand
7=70–85% reduction in stand
6=60–70% reduction in stand
5=50–60% reduction in stand
4=40–50% reduction in stand
3=30–40% reduction in stand
2=20–30% reduction in stand
1=10–20% reduction in stand
0=No apparent effect
a=abnormal, malformed, twisted
c=chlorotic
g=unusual physiological effect
m=moderate injury
r=regrowth
s=severe injury
t=trace to slight injury
—=no test Abbreviations for the plant species employed in the herbicidal activity tests are as follows:

Rag=Ragweed
Ko=Kochia
Le=Lambsquarters
Mu=Mustard
Pi=Pigweed
Ba=Barnyard grass
Cr=Crabgrass
BF=Green Foxtail
WO=Wild Oats
Cor=Corn
Cot=Cotton
Soy=Soybeans
SB=Sugar Beets
AW=Alligator Weed
BW=Bindweed
CT=Canada Thistle
JG=Johnson Grass
NS=Nutsedge
QG=Quackgrass

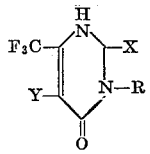

TABLE VI.—PRE-EMERGENCE HERBICIDAL ACTIVITY DATA—DOSAGE 4 LB./ACRE

| X | Y | R | Rag | Ko | La | Mu | Pi | Ba | Cr | GF | WO | Cor | Cot | Soy | SB |
|---|---|---|---|---|---|---|---|---|---|---|---|---|---|---|---|
| O | Br | CH₃ | 3 | — | 5g | 9 | 9 | 7g | 9 | 3g | tg | — | — | — | — |
| O | Br | C₂H₅ | — | 9 | 9 | 9 | 9 | 9 | 9 | 9− | 9 | 9 | 9 | 9 | 9 |
| O | Br | n-C₃H₇ | — | 9 | 9 | 9 | 9 | 9 | 9 | 9 | 9 | 9 | 5 | 3 | 9 |
| O | Br | i-C₃H₇ | — | 9 | 9 | 9 | 9 | 9 | 9 | 9− | tg | 7 | 7 | 9 | |
| O | Br | n-C₄H₉ | — | 9− | 9− | 9− | 3 | tg | tg | 0 | 0 | 0 | t | 0 | 3 |
| O | Br | sec-C₄H₉ | — | 9 | 9 | 9 | 9 | 9c | 9c | 0 | 9c | 9 | s | tg | 9 |
| O | Br | n-C₈H₁₇ | — | 0 | 0 | 0 | tg | 3g | 0 | 0 | 0 | 0 | t | 0 | 0 |
| O | Br | n-C₁₂H₂₅ | — | 0 | 9− | 9 | 9− | 0 | 9 | 0 | 0 | mg | 0 | 9 | 7 |
| O | Br | ⬡ | — | 9− | 9− | 9 | 3g | tg | 3g | 0 | 0 | 0 | 0 | 0 | 3 |
| O | Br | ⬡ | 9 | — | 9 | 9 | 9 | mg | 3g | mg | 9 | mg | 9 | 9 | 9 |
| O | Br | Cl-⬡-Cl | — | tg | mg | 9− | 9 | 0 | mg | tg | 0 | 0 | 0 | 0 | 5 |
| O | Cl | i-C₃H₇ | — | 9 | 9 | 9 | 9 | 9 | 9 | 9 | 9 | 4g | 9 | 9a | 9 |
| O | Cl | n-C₄H₉ | 8 | — | 9 | 9 | 5g | tg | 4g | 3g | ta | — | 9 | mg | — |
| O | Cl | sec-C₄H₉ | — | 9 | 9 | 9 | 9 | 9 | 9 | 9 | 8 | m | 9 | mg | 9 |

TABLE VI—Continued

| X | Y | R | Rag | Ko | La | Mu | Pi | Ba | Cr | GF | WO | Cor | Cot | Soy | SB |
|---|---|---|---|---|---|---|---|---|---|---|---|---|---|---|---|
| O | Br | CH$_2$COC$_2$H$_5$ (=O) | — | 5 | 9 | tg | 9- | 5 | 9 | 9 | 0 | 0 | 0 | 0 | 7 |
| O | F | C$_3$H$_7$-i | — | 9 | 9 | 9 | 9 | 8g | 5g | 7 | 9 | — | — | m | — |
| O | H | CH$_3$ | 3 | — | 9- | 9- | 9 | 9- | 9- | mg | 9c̄ | mg | 0 | m | 0 |
| O | H | C$_2$H$_5$ | 9 | — | 9 | 9 | 9 | 9- | 9- | 9 | 9 | 0 | 9 | 8 | 9 |
| O | H | n-C$_3$H$_7$ | 9 | — | 9 | 9 | 9 | 9 | 9 | 9- | 9- | tg | 9 | m | 9 |
| O | H | i-C$_3$H$_7$ | — | 9 | 9 | 9 | 9 | 9 | 9 | 9 | 9 | mg | 9 | 8 | 9 |
| O | H | n-C$_4$H$_9$ | — | 9 | 9- | 9 | 8 | 8 | 8g | 8g | t | 0 | m | 0 | 9 |
| O | H | sec-C$_4$H$_9$ | — | 9 | 9 | 9 | 9- | 9 | 9 | 9 | 9 | sg | 9 | 9 | 9 |
| O | H | n-C$_8$H$_{17}$ | — | 0 | 5g | 9c̄ | 3g | mg | mg | 3g | 8 | 0 | 0 | tc | 0 |
| O | H | n-C$_{12}$H$_{25}$ | 0 | — | 9 | 9 | 0 | 3g | mg | 9 | s | tg | 0 | t | tg |
| O | H | (cyclohexyl) | — | 9- | 9- | 9 | 7g | 7g | 4g | tg | 0 | 0 | 9- | mc | 8 |
| O | H | (cyclohexenyl) | 9 | — | 9 | 9 | 9 | 3g | 8g | mg | 9 | mg | 9 | 9 | 9 |
| O | H | (dichlorophenyl) | 9 | — | 9 | 9 | 9- | 3g | 9 | 8g | 0 | tg | t | 9 | 7 |
| O | H | CH$_2$COC$_2$H$_5$ (=O) | — | tg | 5 | 9- | 0 | 5 | 9 | 9 | 0 | 0 | 0 | 0 | 9 |
| OH | H | CH$_2$CH=CH$_2$ | — | 9 | 9 | 9 | 9 | 7g | 9 | 9 | 9 | tg | 9 | mg | 9 |
| S | H | i-C$_3$H$_7$ | — | 9- | 9 | 9 | 9 | 9- | 9 | 9 | 9 | t | 9 | mg | 9 |

EXAMPLE 85

Post-emergence herbicidal activity

The post-emergence herbicidal activity of uracils and thiouracils prepared from the novel intermediates of the present invention is demonstrated by treating a variety of monocotyledonous and dicotyledonous plants with the compounds dispersed in aqueous-acetone mixtures. In the test, seedling plants are grown in jiffy flats for about two weeks. The test compounds are dispersed in 50/50 acetone/water mixtures in sufficient quantity to produce the desired concentrations of about four pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated in Table VII below according to the herbitovicity index provided above.

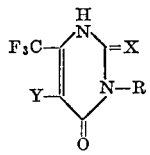

TABLE VII.—POST-EMERGENCE HERBICIDAL ACTIVITY—4 LBS./ACRE ACTIVE INGREDIENT

| X | Y | R | AW | BW | CT | JG | NS | QG | Rag | Ko | La | Mu | Pi | Ba | Cr | GF | Wo |
|---|---|---|---|---|---|---|---|---|---|---|---|---|---|---|---|---|---|
| O | Cl | i-C$_3$H$_7$ | gc | 9 | 9 | mr | t | t | 9 | 9 | 9 | 9 | 9 | 7 | 9- | 9 | 9- |
| O | Cl | n-C$_4$H$_9$ | — | — | — | — | — | — | — | 9 | 9 | 9 | 9 | 8 | 9 | 9 | 7 |
| O | Cl | sec-C$_4$H$_9$ | src | 9r | 9 | t | 5 | t | — | 9 | 9 | 9 | 9 | 9 | 9 | — | — |
| O | Br | CH$_2$CHCH$_2$ (Br Br) | — | — | — | — | — | — | — | 8 | 9 | 9 | 5 | m | 9- | 9- | 3m |
| O | Br | CH$_2$COOC$_2$H$_5$ | 0 | 9 | 9 | 0 | 0 | 0 | 9 | — | 9- | 9 | t | 9 | 9 | 9 | t |
| O | Br | (dichlorophenyl) | t | 9 | 9 | 0 | 0 | 0 | 9 | — | s | 9 | 9 | 5 | 5 | 9 | t |
| O | Br | (cyclohexyl) | tc | 9 | 9 | 0 | 0 | t | — | 9 | 9 | 9 | 9 | 9- | 9 | 9 | 9- |
| O | Br | (cyclohexenyl) | 0 | 9 | 9 | 0 | 0 | 0 | — | 9 | 9 | 9 | 9 | 7 | 7 | 5 | t |
| O | Br | n-C$_{12}$H$_{25}$ | 0 | 9r | t | 0 | 0 | 0 | 5 | — | s | s | m | 3 | t | t | t |
| O | Br | n-C$_8$H$_{17}$ | t | 9 | 9 | 0 | 0 | 0 | — | 9 | 9 | 9 | 9 | t | — | t | 5 |
| O | Br | n-C$_4$H$_9$ | t | 9 | 9 | t | t | t | — | 9 | 9 | 9 | 9 | 9- | 9 | 9 | 9 |
| O | Br | i-C$_3$H$_7$ | 9 | 9 | 9 | 9- | t | s | — | 9 | 9 | 9 | 9 | 9- | 9 | 9 | 9 |
| O | Br | C$_2$H$_5$ | m | 9 | 9 | m | t | m | 9 | — | 9 | 9 | 9 | 9 | 9 | 8 | 9 |
| O | Br | CH$_3$ | — | — | — | — | — | — | — | 9 | 9 | 9 | 9 | 9 | 9 | 9 | 9 |
| O | F | C$_3$H$_7$-i | — | — | — | — | — | — | — | 9- | 9- | 9- | 9- | 0 | 0 | 0 | 0 |
| O | H | CH$_3$ | mc | t | m | 0 | 0 | 0 | — | 9 | 9 | 9 | 9 | 9 | 9 | 9 | 0 |
| O | H | C$_2$H$_5$ | tc | 9 | 9 | 0 | 0 | s | — | 9 | 9 | 9 | 9 | 9 | 9 | 9 | 9 |
| O | H | n-C$_3$H$_7$ | tc | 9 | 9 | 9 | t | 9 | — | 9 | 9 | 9 | 9 | 9 | 9 | 9 | 9 |
| O | H | i-C$_3$H$_7$ | m | 9 | 9 | t | t | m | — | 9 | 9 | 9 | 9 | 9 | 9 | 9 | 9 |
| O | H | n-C$_4$H$_9$ | 0 | 9 | 9 | 0 | 0 | s | — | 9 | 9 | 9 | 5m | 9 | 9 | 9 | 9 |
| O | H | sec-C$_4$H$_9$ | t | 9 | 9 | 9r | 0 | t | 9 | — | 9 | 9 | 9 | 9 | 9 | 9 | 9 |
| O | H | n-C$_8$H$_{17}$ | 0 | t | t | 0 | 0 | 0 | — | 9 | mg | mg | mg | t | t | t | 0 |
| O | H | n-C$_{12}$H$_{25}$ | 0 | 0 | 0 | 0 | 0 | 0 | — | 0 | ta | tc | t | 0 | 0 | 0 | 00 |

TABLE VII.—Continued

| X | Y | R | AW | BW | CT | JG | NS | QG | Rag | Ko | La | Mu | Pl | Ba | Cr | GF | Wo |
|---|---|---|----|----|----|----|----|----|-----|----|----|----|----|----|----|----|----|
| O | H |  | 0 | 9r | 9 | 0 | 0 | 0 | — | 9 | 9 | 9 | 9 | 7 | 8 | 9 | t |
| O | H |  | tc | 9 | 9 | t | 0 | t | — | 9 | 9 | 9 | 9 | 9 | 9 | 9 | 9 |
| O |   |  | 0 | 9 | 9 | t | 0 | t | — | 9 | 9 | 9 | m | 9- | 8 | 9 | 3 |
| O | H | CH₂ĊOC₂H₅ | tc | 9 | 9 | 0 | 0 | 0 | 9 | — | 9- | 9 | t | 9- | 9 | 9 | t |
| O | H | CH₂CH=CH₂ | tc | 9 | 9 | t | 0 | 0 | — | 9 | 9 | 9 | 9 | 9 | 9 | 9 | 9 |
| S | H | i-C₃H₇ | m | 9 | 9 | 0 | 0 | 0 | 9 | — | 9 | 9 | 9 | 9- | 9- | 9- | 9- |

I claim:

1. A process for preparing cytosine compounds having the formula:

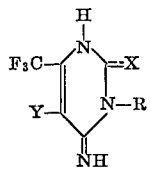

wherein:
  X is selected from the group consisting of sulfur and oxygen;
  Y is selected from the group consisting of hydrogen, chloro, bromo, and fluoro; and
  R is selected from the group consisting of alkyl $C_1$–$C_{12}$, alkenyl $C_2$–$C_6$, phenyl, benzyl and the substituted derivatives thereof wherein said substituted alkyl, alkenyl, phenyl, or benzyl has 1 or 2 substituents selected from the group consisting of halo, nitro, amino, lower alkyl $C_1$–$C_4$, mono(halo)lower alkyl $C_1$–$C_4$, poly halo (lower) alkyl $C_1$–$C_4$, lower alkoxy $C_1$–$C_4$, carboxy and carb (lower) alkoxy $C_1$–$C_4$;
  which comprises contacting a 3-amino-2-substituted 4,4,4-trifluoro-2-butenenitrile of the formula:

$$CF_3(NH_2)C=C(Y)CN$$

with a cyanate of the formula RNCX, wherein Y, R, and X are as described above, in the presence of an inert solvent and at least 1.0 mole equivalent of strong base per mole of butenenitrile reactant.

2. A process according to claim 1 wherein: the mole ratio of RNCX to butenenitrile is from 1:1 to 2:1; the solvent is selected from the group consisting of 6 to 8 carbon aromatic and halogenated aromatic solvents, 1 to 8 carbon alcohols, low molecular weight glycol ethers and dipolar aprotic solvents; and the strong base is selected from the group consisting of alkali metal alkoxides; alkali metal hydroxides, and alkali metal hydrides.

3. A process according to claim 2 wherein about 1.0 to 3 mole equivalents of base are used per mole of butenenitrile.

4. A process according to claim 2 wherein the reaction is carried out at a temperature between about 0° C. and 60° C.

5. A process according to claim 1 wherein Y is selected from the group consisting of hydrogen, chloro and fluoro.

6. A process according to claim 1 wherein Y is chloro.

7. A process according to claim 2 wherein: the mole ratio of RNCX to butenenitrile is about 1 to 1; the mole ratio of base to butenenitrile is 2 to 1; the solvent is a dipolar aprotic solvent; and the reaction temperature is maintained between about 15° C. and 50° C.

8. A cytosine compound of the formula:

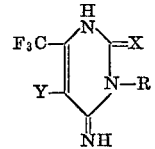

wherein:
  X,Y and R are as defined in claim 1;
  and water soluble salts of said compounds and tautomers.

9. A compound according to claim 8 wherein Y is selected from the group consisting of hydrogen, chloro and fluoro.

10. A compound according to claim 8 wherein X is oxygen, R is alkyl and Y is halogen.

11. A compound according to claim 8 wherein X is oxygen, Y is halogen and R is phenyl, benzyl, substituted phenyl, or substituted benzyl.

12. A compound according to claim 8 wherein X is oxygen, Y is halogen and R is alkenyl.

13. A compound according to claim 8 wherein X is sulfur.

14. A process for preparing a uracil or thiouracil of the formula:

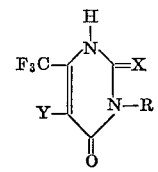

wherein:
  X is selected from the group consisting of sulfur and oxygen;
  Y is selected from the group consisting of hydrogen, chloro, bromo, and fluoro; and
  R is selected from the group consisting of alkyl $C_1$–$C_{12}$, alkenyl $C_2$–$C_6$, phenyl, benzyl and the substituted derivatives thereof wherein said substituted alkyl, alkenyl, phenyl, or benzyl has 1 or 2 substituents selected from the group consisting of halo, nitro, amino, lower alkyl $C_1$–$C_4$, mono(halo)lower alkyl $C_1$–$C_4$, poly halo (lower) alkyl $C_1$–$C_4$, lower alkoxy $C_1$–$C_4$, carboxy and carb (lower) alkoxy $C_1$–$C_4$;
which comprises the steps of:
(a) forming a cytosine compound by contacting a 3-amino-2-substituted 4,4,4-trifluoro-2-butenenitrile of the formula:

$$CF_3(NH_2)C=C(Y)CN$$

with a cyanate of the formula RNCX, wherein Y, R, and X are as described above, in the presence of an inert solvent and at least 1.0 mole equivalent of strong base per mole of butenenitrile reactant; and
(b) contacting the cytosine thus produced with aqueous acid to diaminate the cytosine to produce the above uracil or thiouracil.

References Cited
UNITED STATES PATENTS 3,324,126   6/1967   Mertes et al. _____ 260—256.4 C ALEX MAZEL, Primary Examiner R. J. GALLAGHER, Assistant Examiner U.S. Cl. X.R.

71—92; 260—251 R, 256.4 C, 260, 465.4, 465.5